(12) United States Patent
Toothaker et al.

(10) Patent No.: US 11,167,411 B2
(45) Date of Patent: Nov. 9, 2021

(54) QUICK-RELEASE MECHANISM FOR TOOL ADAPTER PLATE AND ROBOTS INCORPORATING THE SAME

(71) Applicants: Calvin Toothaker, Cambridge, MA (US); Umberto Scarfogliero, Redwood City, CA (US); Daniel Cookson, Rowley, MA (US)

(72) Inventors: Calvin Toothaker, Cambridge, MA (US); Umberto Scarfogliero, Redwood City, CA (US); Daniel Cookson, Rowley, MA (US)

(73) Assignee: RETHINK ROBOTICS GmbH, Rheinbollen (DE)

( * ) Notice: Subject to any disclaimer, the term of this patent is extended or adjusted under 35 U.S.C. 154(b) by 163 days.

(21) Appl. No.: 15/935,418

(22) Filed: Mar. 26, 2018

(65) Prior Publication Data

US 2018/0257221 A1 Sep. 13, 2018

Related U.S. Application Data

(63) Continuation-in-part of application No. 15/463,682, filed on Mar. 20, 2017, now Pat. No. 10,099,371, (Continued)

(51) Int. Cl.
*G05B 19/04* (2006.01)
*G05B 19/18* (2006.01)
(Continued)

(52) U.S. Cl.
CPC ............ *B25J 9/08* (2013.01); *B25J 9/1612* (2013.01); *B25J 15/0416* (2013.01); (Continued)

(58) Field of Classification Search
CPC ...... B25J 9/08; B25J 15/0416; B25J 19/0033; B25J 15/0491; B25J 15/0483; (Continued)

(56) References Cited

U.S. PATENT DOCUMENTS 4,431,334 A 2/1984 Cleveland et al.
5,002,500 A 3/1991 Zuccaro et al.
(Continued)

FOREIGN PATENT DOCUMENTS

| EP | 0092669 | 3/1983 |
|----|---------|--------|
| EP | 3135443 | 3/2017 |

(Continued)

OTHER PUBLICATIONS

International Search Report and Written Opinion, International Application No. PCT/US2018/024276, dated Jul. 5, 2018, 28pages.
(Continued)

*Primary Examiner* — Harry Y Oh
*Assistant Examiner* — Sohana Tanju Khayer
(74) *Attorney, Agent, or Firm* — Morgan, Lewis & Bockius LLP

(57) ABSTRACT

In various embodiments, a tool plate configured to receive a robotic end effector is removably matable with a robot appendage via a quick-release mechanism.

27 Claims, 13 Drawing Sheets

Related U.S. Application Data which is a continuation of application No. 14/833,660, filed on Aug. 24, 2015, now Pat. No. 9,630,315.

(60) Provisional application No. 62/482,958, filed on Apr. 7, 2017.

(51) Int. Cl.
  *B25J 9/08* (2006.01)
  *B25J 9/16* (2006.01)
  *B25J 15/04* (2006.01)
  *B25J 19/00* (2006.01)
  *G05B 19/12* (2006.01)

(52) U.S. Cl.
  CPC ....... *B25J 15/0483* (2013.01); *B25J 15/0491* (2013.01); *B25J 19/0033* (2013.01); *B25J 19/0025* (2013.01); *G05B 19/128* (2013.01); *G05B 2219/31095* (2013.01); *G05B 2219/39468* (2013.01); *G05B 2219/49304* (2013.01); *G05B 2219/50338* (2013.01); *Y10S 901/02* (2013.01)

(58) Field of Classification Search
  CPC ............... B25J 9/1612; B25J 19/0025; G05B 2219/39468; G05B 19/128; G05B 2219/49304; G05B 2219/50338; G05B 2219/31095; Y10S 901/02
  See application file for complete search history.

(56) References Cited

U.S. PATENT DOCUMENTS

| | | | |
|---|---|---|---|
| 5,607,139 A | 3/1997 | Kjellberg | |
| 6,331,181 B1 | 12/2001 | Tierney et al. | |
| 7,239,940 B2 | 7/2007 | Wang et al. | |
| 7,252,453 B1 | 8/2007 | Little | |
| 7,379,790 B2 | 5/2008 | Toth et al. | |
| 8,224,484 B2 | 7/2012 | Swarup et al. | |
| 8,452,447 B2 | 5/2013 | Nixon | |
| 8,844,789 B2 | 9/2014 | Shelton, IV et al. | |
| 9,505,136 B1* | 11/2016 | Nusser | B25J 15/0408 |
| 9,630,315 B2 | 4/2017 | Cookson et al. | |
| 9,815,208 B2* | 11/2017 | Strobietto | B25J 15/04 |
| 2003/0226887 A1 | 12/2003 | Komine et al. | |
| 2004/0037688 A1* | 2/2004 | Ansell | B25J 9/0009 |
| | | | 414/729 |
| 2005/0065647 A1* | 3/2005 | Perry | B25J 9/161 |
| | | | 700/245 |
| 2007/0203477 A1* | 8/2007 | Lechot | A61B 17/1666 |
| | | | 606/1 |
| 2009/0044655 A1* | 2/2009 | DeLouis | B25J 15/045 |
| | | | 74/490.05 |
| 2010/0180711 A1* | 7/2010 | Kilibarda | B25J 9/10 |
| | | | 74/490.06 |
| 2010/0241260 A1 | 9/2010 | Kilibarda et al. | |
| 2010/0267270 A1 | 10/2010 | Jehmlich et al. | |
| 2010/0301568 A1* | 12/2010 | Geyer | B23Q 3/15553 |
| | | | 279/9.1 |
| 2012/0207538 A1* | 8/2012 | Rizk | B25J 15/0491 |
| | | | 403/315 |
| 2012/0298706 A1 | 11/2012 | Gordon et al. | |
| 2013/0274918 A1* | 10/2013 | Zurbau | B25J 9/16 |
| | | | 700/245 |
| 2013/0340560 A1 | 12/2013 | Burridge et al. | |
| 2014/0180310 A1 | 6/2014 | Blumenkranz et al. | |
| 2014/0276951 A1* | 9/2014 | Hourtash | A61B 34/35 |
| | | | 606/130 |
| 2014/0363223 A1 | 12/2014 | Goto et al. | |
| 2015/0032252 A1 | 1/2015 | Galluzzo et al. | |
| 2015/0088300 A1 | 3/2015 | Kilibarda et al. | |
| 2015/0120041 A1 | 4/2015 | Wise et al. | |
| 2016/0052146 A1* | 2/2016 | Berrocal | B25J 15/0441 |
| | | | 483/1 |
| 2016/0059424 A1* | 3/2016 | Zachary | B23B 31/1071 |
| | | | 483/1 |
| 2016/0236357 A1 | 8/2016 | Kalb et al. | |
| 2016/0250753 A1 | 9/2016 | Yoshizawa | |
| 2017/0057085 A1 | 3/2017 | Cookson et al. | |
| 2017/0190050 A1 | 7/2017 | Cookson et al. | |

FOREIGN PATENT DOCUMENTS

| | | |
|---|---|---|
| JP | 59-1812 | 1/1984 |
| JP | H03117584 | 5/1991 |
| JP | 2006-90401 A | 4/2006 |
| JP | 2014202310 A | 10/2014 |
| JP | 2015-203476 A | 11/2015 |
| JP | 2017-42909 | 3/2017 |

OTHER PUBLICATIONS

European Search Report, European Application No. 16184002.0, dated Jan. 25, 2017, 10 pages.
Official Communication, for Japanese Patent Application 2020-504092, dated Dec. 21, 2020 with English Translation, 12 pages.
European Search Report for European Application No. 18781587.3, dated Dec. 11, 2020, 13 pages.
Extended European Search Report for corresponding application No. 19213914.5, dated Mar. 13, 2020, 9 pages.

\* cited by examiner

QUICK-RELEASE MECHANISM FOR TOOL ADAPTER PLATE AND ROBOTS INCORPORATING THE SAME

RELATED APPLICATIONS

This application claims the benefit of and priority to U.S. Provisional Patent Application No. 62/482,958, filed Apr. 7, 2017. This application is also a continuation-in-part of U.S. patent application Ser. No. 15/463,682, filed Mar. 20, 2017, which is a continuation of U.S. patent application Ser. No. 14/833,660, filed Aug. 24, 2015, now issued as U.S. Pat. No. 9,630,315. The entire disclosure of each of these references is hereby incorporated herein by reference.

TECHNICAL FIELD

In various embodiments, the present invention relates to robot configuration and operation.

BACKGROUND

Industrial robots perform a variety of tasks involving the movement and manipulation of physical objects. A typical industrial robot may, for example, have one or more arms, equipped with grippers, that allow the robot to pick up objects at a particular location, transport them to a destination location, and put them down in accordance with particular coordinates, thereby, for example, stacking them or placing them into cardboard boxes present at the destination location.

Robots may manipulate different types of objects and perform many tasks beyond simply moving them—for example, welding, joining, applying fasteners, etc. As a result, many different "end effectors" have been developed for deployment on robot appendages; some of these end effectors, such as grippers, have utility across a range of tasks, while others, such as weld guns, are designed to perform a single, specialized task. To promote versatility, a commercial robot may accommodate different end effectors. For example, different end effectors may share a common linkage design that permits them to be interchangeably mounted to the cuff or wrist of a robot arm. Accommodating the robot to the end effector operationally is more difficult. Frequently, selection of the end effector for a robot occurs during system integration or assembly and is essentially permanent; the programming necessary to operate the selected end effector is written into the controller code for the robot. In some robots, end effectors may be changed dynamically during operation, but typically this occurs at preprogrammed phases of task execution; that is, the robot controller code signals the need for a new end effector when the code governing the next task expects a replacement. Even dynamic changes in the robot's end effector, in other words, occur in response to robot expectation as it executes tasks or when the robot is outfitted for a new task.

What is needed, therefore, is a more versatile approach to hot-swapping of end effectors that permits arbitrary replacement by the operator and dynamic accommodation by the robot. The operator, for example, may find during operation that the task being performed by the robot unexpectedly requires finer control than the current set of grippers permits. In such circumstances, the operator will want to replace the existing grippers with a more suitable end effector, but without rewriting the robot's task-execution code.

SUMMARY

Embodiments of the present invention relate to robots capable of accommodating dynamic replacement of end effectors, and hardware and software associated with the end effectors that facilitate communication with the robot to dynamically load and run software that allows the end effector to be operated without change to the main control program. Such effector-specific programming is herein generically referred to as a "driver." The driver may be dynamically linked and run during program execution when the corresponding end effector is detected. Typically, the robot controller will store a library of drivers, and load the appropriate driver when a new end effector is detected; this process is referred to herein as "self-configuration." The controller code itself, however, may issue generic commands not tied to any particular driver but to which appropriate drivers are coded to respond. This avoids the need to make changes at the controller-code level to accommodate different end effectors.

The term "configuration data" or "configuration information" refers to information identifying or helping to instantiate (e.g., select and parameterize) the proper driver for a particular end effector. Thus, configuration data may be an actual driver, parameters used to tailor a generic driver to a particular end effector, or merely an identifier for the type of driver needed. The term "identifier" or "identification data" refers to information that identifies the end effector and that may be combined with or used to locate appropriate configuration information for the end effector. As explained herein, drivers, configuration data and identifiers may be variously distributed among components of a system depending on design priorities and preferences.

In various embodiments, the end effector is not connected directly to the robot appendage but instead to a "tool plate" that is removably mounted to the distal end of the robot appendage. The tool plate receives the end effector mechanically and may supply power and, in some cases, data signals thereto. Various types and degrees of functionality can be distributed between the end effector and the tool plate, and the latter may accommodate more than one type of end effector. This arrangement facilitates flexible deployment of capabilities as best suited to a particular robot architecture; for example, one component may be "dumb" (e.g., incapable of communication or data processing) and the other "smart" (e.g., capable of communicating with the robot and performing data-processing operations). Thus, one implementation features a "dumb" end effector and a "smart" tool plate. The smart tool plate may detect which of multiple types of connectable end effectors has been attached to it (e.g., based on electrical characteristics or the mechanical configuration of the end effector's connector), reporting this to the robot controller, which loads the appropriate driver. Alternatively, the smart tool plate may accommodate only a single type of end effector, in which case it need only report its own identity to the robot controller, since this is sufficient to determine the proper driver.

Another implementation features a "smart" end effector and a "dumb" tool plate, in which case the tool plate merely facilitates communication between the end effector's on-board processor or controller and the robot controller; the end effector reports its identity in a wired or wireless fashion to the robot controller. In this configuration, the tool plate may, for example, serve as an adapter between the robot appendage and a mechanically incompatible end effector. As explained below, "reporting" may be active (the "smart" component may initiate communication with the robot controller on its own and send information) or passive (the "smart" component may respond to a polling signal or other communication from the robot controller, which has detected attachment).

Various embodiments of the present invention feature a tool plate that has a "robot side" or "robot portion" incorporating a quick-release mechanism and that is secured to the end or "cuff" of the robot appendage, and a "tool side" or "tool portion" (opposed to the robot side) that receives one or more end effectors. Typically, the robot side, and thus the quick-release mechanism, is fixedly mounted (e.g., bolted) to the robot arm; thus, herein references to the "tool plate" may refer collectively to the robot side and the tool side or to the tool side alone. The tool side of the tool plate is fixedly mounted (e.g., bolted) to one or more end effectors, although the end effector(s) utilized with the tool side may be interchanged (via, e.g., use of a removable adaptor plate that constitutes part of the tool side; the adaptor plate and/or the end effector may be removed and replaced). This arrangement enables not only the end effectors but also the tool plate (or a portion thereof) to be conveniently interchanged or connected to another robot (via another robot-side portion affixed thereto) with mechanical security but without tools, air pressure, or electric actuation. In various embodiments, the quick-release mechanism contains captive spherical bearing balls that move radially inward or outward depending on the position of an axially slidable retaining ring, and which are received within complementary depressions in the tool side of the tool plate. The inner surface of the sliding ring may be tapered so that axial motion of the sliding ring causes radial movement of the bearing balls and secures them within the depressions. To release the tool side of the tool plate from the robot side, the sliding ring is manually shifted, allowing the bearing balls to move radially outward, thereby freeing the tool plate. A removable security collar may be employed to prevent this sliding movement and, hence, keep the tool plate secured to the robot both axially and rotationally.

In an aspect, embodiments of the invention feature an interchangeable end-effector assembly for use with a robot system including, consisting essentially of, or consisting of a robot body, a robot arm connected to the robot body and having a distal end including a first connector, a robot controller for controlling the robot arm, and an end effector connected thereto via the first connector. The end-effector assembly includes, consists essentially of, or consists of a tool plate removably connectable to the robot arm, and a quick-release mechanism for removably retaining the tool plate against the robot arm. The tool plate includes (1) nonvolatile memory storing and/or configured to store data including, consisting essentially of, or consisting of identification information and/or configuration information, (2) a communication interface, (3) a processor, and (4) a second connector matable with the first connector for establishing bidirectional communication between the processor and the robot controller via the communication interface. The processor may be configured to cause transmission of the data to the robot controller upon mating of the first and second connectors.

Embodiments of the invention may include one or more of the following in any of a variety of combinations. The tool plate may include, consist essentially of, or consist of a raised portion having a series of depressions circumferentially arranged around a side wall thereof. The quick-release mechanism may include, consist essentially of, or consist of a recess for receiving the raised portion of the tool plate, a ring surrounding the recess and slidable along an axis concentric therewith, and a plurality of bearing balls arranged circumferentially around an interior surface of the slidable ring. Axial movement of the ring in a first direction may lock the bearing balls within the depressions of the raised portion of the tool plate, thereby retaining the tool plate within the quick-release mechanism, and axial movement of the ring in a second direction opposed to the first direction may release the bearing balls from the depressions, thereby releasing the tool plate from the quick-release mechanism. The slidable ring may have a tapered inner surface for translating the bearing balls into the depressions during axial movement of the ring in the first direction. The end-effector assembly or the quick-release mechanism may include a spring-loaded, retractable retention ring. The retention ring may prevent inward radial movement of the bearing balls in a rest position and, when retracted against the spring loading in response to entry of the raised portion of the tool plate, may allow movement of the bearing balls into the depressions. The retention ring may be spring-loaded via a compression wave spring. The end-effector assembly or the quick-release mechanism may include a removable security collar configured to engage with the quick-release mechanism proximate the slidable ring, whereby axial movement of the slidable ring in the second direction is prevented. The end effector may have a third connector. The tool plate may include a removable adaptor plate, and the adaptor plate may have a fourth connector matable with the third connector. The adaptor plate may be disposed opposite the second connector of the tool plate.

In another aspect, embodiments of the invention feature a robot system that includes, consists essentially of, or consists of a robot body, a robot arm connected to the robot body, a robot controller, a tool plate removably connectable to the robot arm, an end effector connected to the tool plate, and a quick-release mechanism for removably retaining the tool plate against the robot arm. The robot arm has a distal end including a first connector. The robot controller controls the robot arm and an end effector connected thereto via the first connector. The tool plate includes (1) nonvolatile memory storing and/or configured to store data including, consisting essentially of, or consisting of identification information and/or configuration information, (2) a communication interface, (3) a processor, and (4) a second connector matable with the first connector for establishing bidirectional communication between the processor and the robot controller via the communication interface. The processor may be configured to cause transmission of the data to the robot controller upon mating of the first and second connectors.

Embodiments of the invention may include one or more of the following in any of a variety of combinations. The robot controller may be adapted to self-configure based on the data and to control movements of the connected end effector based on the self-configuration. The data may include, consist essentially of, or consist of both identification information and configuration information. The data may not include configuration information. The robot system may include a database including records relating end-effector identification information to configuration information for the end effector. The robot controller may be further adapted to query the database using the identification information to obtain the corresponding configuration information and to self-configure based thereon. The data may include configuration information. The configuration information may specify a driver for controlling the end effector. The configuration information may include, consist essentially of, or consist of the driver, one or more parameters usable to tailor a generic driver to the end effector, and/or an identifier specifying a type of the driver.

The tool plate may include, consist essentially of, or consist of a raised portion having a series of depressions circumferentially arranged around a side wall thereof. The quick-release mechanism may include, consist essentially of, or consist of a recess for receiving the raised portion of the tool plate, a ring surrounding the recess and slidable along an axis concentric therewith, and a plurality of bearing balls arranged circumferentially around an interior surface of the slidable ring. Axial movement of the ring in a first direction may lock the bearing balls within the depressions of the raised portion of the tool plate, thereby retaining the tool plate within the quick-release mechanism, and axial movement of the ring in a second direction opposed to the first direction may release the bearing balls from the depressions, thereby releasing the tool plate from the quick-release mechanism. The slidable ring may have a tapered inner surface for translating the bearing balls into the depressions during axial movement of the ring in the first direction. The end-effector assembly or the quick-release mechanism may include a spring-loaded, retractable retention ring. The retention ring may prevent inward radial movement of the bearing balls in a rest position and, when retracted against the spring loading in response to entry of the raised portion of the tool plate, may allow movement of the bearing balls into the depressions. The retention ring may be spring-loaded via a compression wave spring. The end-effector assembly or the quick-release mechanism may include a removable security collar configured to engage with the quick-release mechanism proximate the slidable ring, whereby axial movement of the slidable ring in the second direction is prevented. The end effector may have a third connector. The tool plate may include a removable adaptor plate, and the adaptor plate may have a fourth connector matable with the third connector. The adaptor plate may be disposed opposite the second connector of the tool plate.

In yet another aspect, embodiments of the invention feature a robot system that includes, consists essentially of, or consists of a robot body, a robot arm connected to the robot body, a robot controller, a tool plate removably connectable to the robot arm via a first tool-plate connector matable with the robot connector, a quick-release mechanism for removably retaining the tool plate against the robot arm, and an end effector removably connectable to the robot arm. The robot arm has a distal end including a robot connector. The robot controller controls the robot arm and an end effector connected thereto. The tool plate includes a second tool-plate connector opposite the first tool-plate connector. The end effector includes (1) nonvolatile memory storing and/or configured to store data including, consisting essentially of, or consisting of identification information and/or configuration information, (2) a communication interface, (3) a processor, and (4) an end-effector connector matable with the second tool-plate connector for establishing bidirectional communication between the processor and the robot controller via the communication interface. The processor may be configured to cause transmission of the data to the robot controller upon mating of the end effector and the tool plate with the robot arm.

Embodiments of the invention may include one or more of the following in any of a variety of combinations. The data may not include configuration information. The tool plate may include nonvolatile memory storing configuration information and circuitry for locating configuration information corresponding to the end effector based on the data. The robot controller may be adapted to self-configure based on the data and to control movements of the connected end effector based on the self-configuration. The data may include, consist essentially of, or consist of both identification information and configuration information. The robot system may include a database including records relating end-effector identification information to configuration information for the end effector. The robot controller may be further adapted to query the database using the identification information to obtain the corresponding configuration information and to self-configure based thereon. The data may include configuration information. The configuration information may specify a driver for controlling the end effector. The configuration information may include, consist essentially of, or consist of the driver, one or more parameters usable to tailor a generic driver to the end effector, and/or an identifier specifying a type of the driver.

The tool plate may include, consist essentially of, or consist of a raised portion having a series of depressions circumferentially arranged around a side wall thereof. The quick-release mechanism may include, consist essentially of, or consist of a recess for receiving the raised portion of the tool plate, a ring surrounding the recess and slidable along an axis concentric therewith, and a plurality of bearing balls arranged circumferentially around an interior surface of the slidable ring. Axial movement of the ring in a first direction may lock the bearing balls within the depressions of the raised portion of the tool plate, thereby retaining the tool plate within the quick-release mechanism, and axial movement of the ring in a second direction opposed to the first direction may release the bearing balls from the depressions, thereby releasing the tool plate from the quick-release mechanism. The slidable ring may have a tapered inner surface for translating the bearing balls into the depressions during axial movement of the ring in the first direction. The end-effector assembly or the quick-release mechanism may include a spring-loaded, retractable retention ring. The retention ring may prevent inward radial movement of the bearing balls in a rest position and, when retracted against the spring loading in response to entry of the raised portion of the tool plate, may allow movement of the bearing balls into the depressions. The retention ring may be spring-loaded via a compression wave spring. The end-effector assembly or the quick-release mechanism may include a removable security collar configured to engage with the quick-release mechanism proximate the slidable ring, whereby axial movement of the slidable ring in the second direction is prevented. The tool plate may include a removable adaptor plate on which the second tool-plate connector is disposed.

In another aspect, embodiments of the invention feature a quick-release mechanism comprising a recess for receiving an article to be locked thereto. The quick-release mechanism includes, consists essentially of, or consists of a ring surrounding the recess and slidable along an axis concentric therewith and a plurality of bearing balls arranged circumferentially around an interior surface of the slidable ring. Axial movement of the ring in a first direction locks the bearing balls within complementary depressions in the article, thereby retaining the article within the quick-release mechanism. Axial movement of the ring in a second direction opposed to the first direction releases the bearing balls from the depressions, thereby releasing the article from the quick-release mechanism.

Embodiments of the invention may include one or more of the following in any of a variety of combinations. The slidable ring may have a tapered inner surface for translating the bearing balls into the depressions during axial movement of the ring in the first direction. The quick-release mechanism may include a spring-loaded, retractable retention ring. The retention ring may prevent inward radial movement of the bearing balls in a rest position. When retracted against the spring loading in response to entry of the article, the retention ring may allow movement of the bearing balls into the depressions. The retention ring may be spring-loaded via a compression wave spring. The quick-release mechanism may include a removable security collar configured to engage with the quick-release mechanism proximate the slidable ring, whereby axial movement of the slidable ring in the second direction is prevented.

In yet another aspect, embodiments of the invention feature an interchangeable tool plate for use with a robot system that includes, consists essentially of, or consists of a robot body, a robot arm connected to the robot body and having a distal end including a robot connector, a robot controller for controlling the robot arm, and a quick-release mechanism connected to the distal end of the robot arm. The tool plate includes, consists essentially of, or consists of a raised portion matable within a recessed portion of the quick-release mechanism and an electrical connector configured to engage a complementary electrical connector when the raised portion is received within the quick-release mechanism. The raised portion includes a plurality of depressions circumferentially distributed around a side wall thereof. The depressions are sized and shaped to lockably receive bearing balls from the quick-release mechanism for removable retention of the tool plate within the quick-release mechanism.

Embodiments of the invention may include one or more of the following in any of a variety of combinations. The tool plate may include a tool-plate connector opposite the raised portion for receiving an end effector. The tool plate may include a removable adaptor plate on which the tool-plate connector is disposed. The tool plate may include nonvolatile memory storing and/or configured to store data. The robot controller may be adapted to self-configure based on the data and to control movements, based on the self-configuration, of an end effector connected to the tool plate. The data may include, consist essentially of, or consist of identification information and/or configuration information. The data may include, consist essentially of, or consist of identification information and configuration information. The data may not include configuration information. The robot system may include a database including records relating end-effector identification information to end-effector configuration information. The robot controller may be adapted to query the database using the identification information to obtain the corresponding configuration information and to self-configure based thereon. The data may include, consist essentially of, or consist of configuration information. The configuration information may specify a driver for controlling an end effector matable to the tool plate. The configuration information may include, consist essentially of, or consist of the driver, one or more parameters usable to tailor a generic driver to the end effector, and/or an identifier specifying a type of the driver. The tool plate may include a processor and a communication interface for bidirectional communication between the robot controller and the processor. The processor may be configured to cause transmission of the data to the robot controller upon mating of the electrical connector with the complementary electrical connector. The tool plate may include a removable security collar for locking the tool plate to the quick-release mechanism. The security collar may be circular or semicircular.

These and other objects, along with advantages and features of the present invention herein disclosed, will become more apparent through reference to the following description, the accompanying drawings, and the claims.

Furthermore, it is to be understood that the features of the various embodiments described herein are not mutually exclusive and may exist in various combinations and permutations. As used herein, the terms "approximately," "about," and "substantially" mean±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
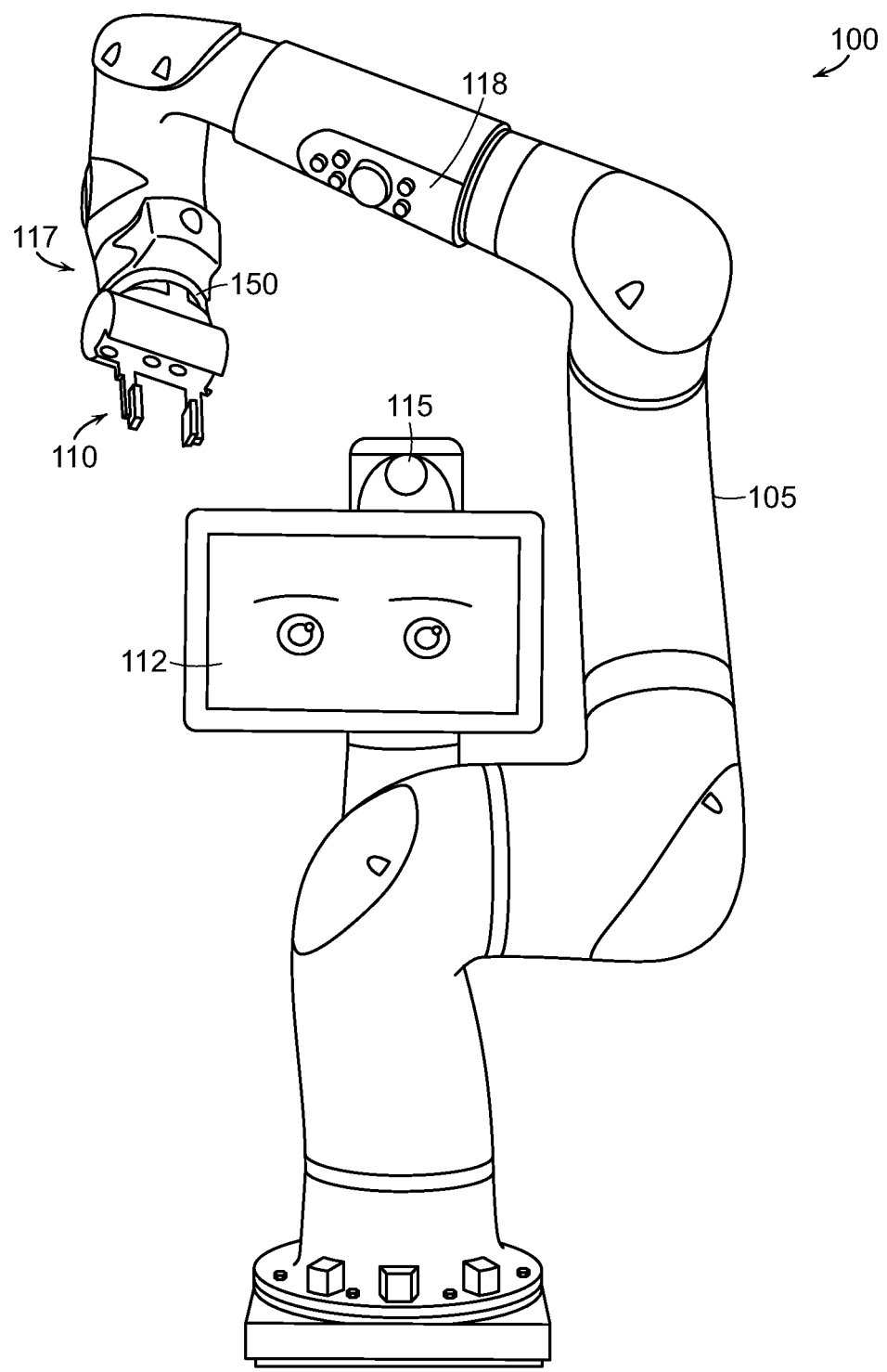
FIG. 1A is a perspective view of a robot in accordance with various embodiments of the invention.
Figure 1B:
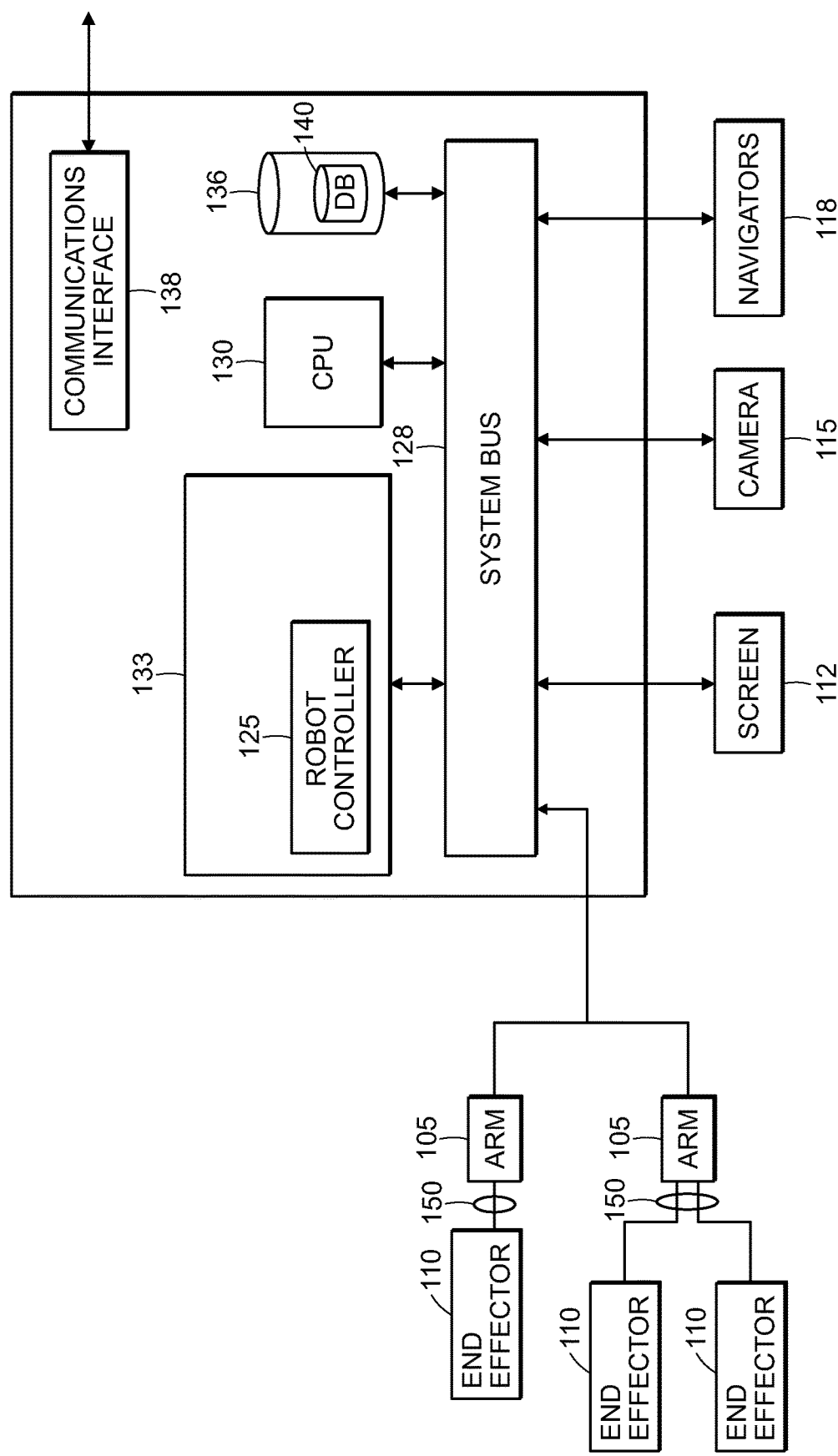
FIG. 1B schematically illustrates internal and external components of the robot shown in FIG. 1A.

Refer first to FIGS. 1A and 1B, which illustrate, respectively, a perspective view of a representative robot 100 and a schematic detailing the various internal operative components. The robot 100 includes at least one robot arm 105—as shown in FIG. 1B, a robot may have more than one arm—that terminates in one or more end effectors 110 for manipulating objects. The arm 105 has several (e.g., seven) degrees of freedom provided by suitable (and conventional) rotational joints. Each joint desirably employs a series elastic actuator, enabling the robot to sense external forces applied to it, such as, e.g., forces resulting from unexpected collisions. In the embodiment illustrated in FIG. 1A, a parallel jaw gripper 110 that allows the robot to grasp, lift, and move objects is mounted at the end of the arm 105; as explained below, the gripper 110 is just one of many possible end effectors. The robot 100 also has a head-like screen 112, which may display a pair of eyes or other output reinforcing the robot's orientation to nearby personnel or announcing its state. In some embodiments, the screen 110 can rotate about a vertical access, and nod about a horizontal axis running parallel to the long axis of the screen 110.

The robot 100 includes one or more cameras 115. In FIG. 1A, a camera 115 is shown above the screen 112. The robot 100 may also include one or more range sensors in the wrist 117 of the appendage 105, and in some embodiments, one or more sonar sensors detects moving objects in the environment. In addition to these sensors for visually and/or acoustically detecting objects, the robot 100 may include a number of touch-sensitive sensors and mechanical features on the arm 105 that facilitate mechanical interaction with a person (e.g., a trainer). For example, the robot 100 may include a set 118 of knobs and buttons (a "navigator") that allows the user to respond to information displayed on the screen 112 (e.g., by selecting menu items, switching between training and execution mode) and enter numbers (e.g., to indicate in how many rows and columns objects are to be packed in a box) or text (e.g., passwords or object and task names) via a digital rotary knob.

The robot 100 described above is, of course, only one of many possible robot embodiments in accordance with the invention, and the various features described above are representative rather than limiting. Various components and features may be modified in manners that will be readily apparent to persons of skill in the art. For example, the robot may, generally, have any number of arms (or, more generally, appendages), and each arm may have any number of degrees of freedom. The links of the arms need not be joined by rotational joints with one degree of freedom (such as, e.g., hinge joints), but may, for example, include ball-and-socket joints that provide two rotational degrees of freedom, or rail systems that facilitate translational motion.

Robot operation is governed by a robot controller 125, which monitors and alters robot positions, kinematics, dynamics, and forces; controls joint-level actuators to move the robot and/or its moving parts as directed by the robot controller; and high-level computational functionality that facilitates image-processing, user interaction, etc. The robot controller 125 may generally be implemented in hardware, software, or a combination of both on a general-purpose or special-purpose computer, which includes a bidirectional system bus 128 over which the central processing unit (CPU) 130, memory 133, and storage devices 136 communicate with each other as well as with internal or external input/output devices such as the screen 112, the camera 115, navigators 118, wrist cuffs, and any other input devices and/or external sensors. A conventional communication interface 138 facilitates communications over a network, such as the Internet and/or any other land-based or wireless telecommunications network or system. The storage devices 136 store an end-effector database 140 which, as explained in greater detail below, maintains information relevant to the various types of end effectors 110 that may be associated with the robot 100. The various modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages. The robot controller 125 may be implemented in software, hardware, or a combination.

The end effector 110 is connected to the robot arm 105 via a tool plate 150, which may accommodate more than one type of end effector 110 and, in some implementations, more than one end effector at a time. In this way, the tool plate 150 acts as a "universal" connector that is mechanically and electrically connected to the robot 100 via the robot arm 105, and which receives mechanical and electrical connectors from the end effector 110. In addition, the tool plate 150 assists the robot controller 125 in locating and installing the appropriate driver for a particular end effector 110. In various embodiments, the tool plate 150 may alert the robot controller when an end effector has been removed and replaced with a different (but compatible) end effector, providing information that allows the controller 125 to locate, load, and run the appropriate new driver in real time. The tool plate 150 may be one of several differently configured tool plates, each having identical mechanical and electrical connectors for mating with the robot arm 105 but different receptacles for receiving different end effectors. In this way, it is possible to accommodate more end effectors than the number of receptacles a single tool plate could physically support, and also facilitates system extensibility: as new end effectors with different connector configurations are developed, it is not necessary to replace the entire robot 100 or even the robot arm 105; rather, the ability to swap tool plates 150 means it is only necessary to design a new tool plate. Features of the tool plate 150 described below provide flexibility in this regard.

As described in more detail below, in various embodiments the tool plate 150 includes, consists essentially of, or consists of two different portions. Specifically, a first portion of the tool plate 150 may attach to and may remain affixed to the robot arm 105, and a second portion of the tool plate 150 may be reversibly mechanically engaged with the first portion. This second portion of the tool plate 150 may be affixed to an end effector and may even incorporate a detachable adaptor plate for connecting to the end effector. In this manner, either the entire second portion of the tool plate 150 or the adaptor plate may be switched out, if necessary, to accommodate other types of end effectors. The first portion of the tool plate 150 may incorporate a quick-release mechanism, as described in additional detail below, which facilitates attachment and disengagement of the second portion of the tool plate 150.

Figure 2A:
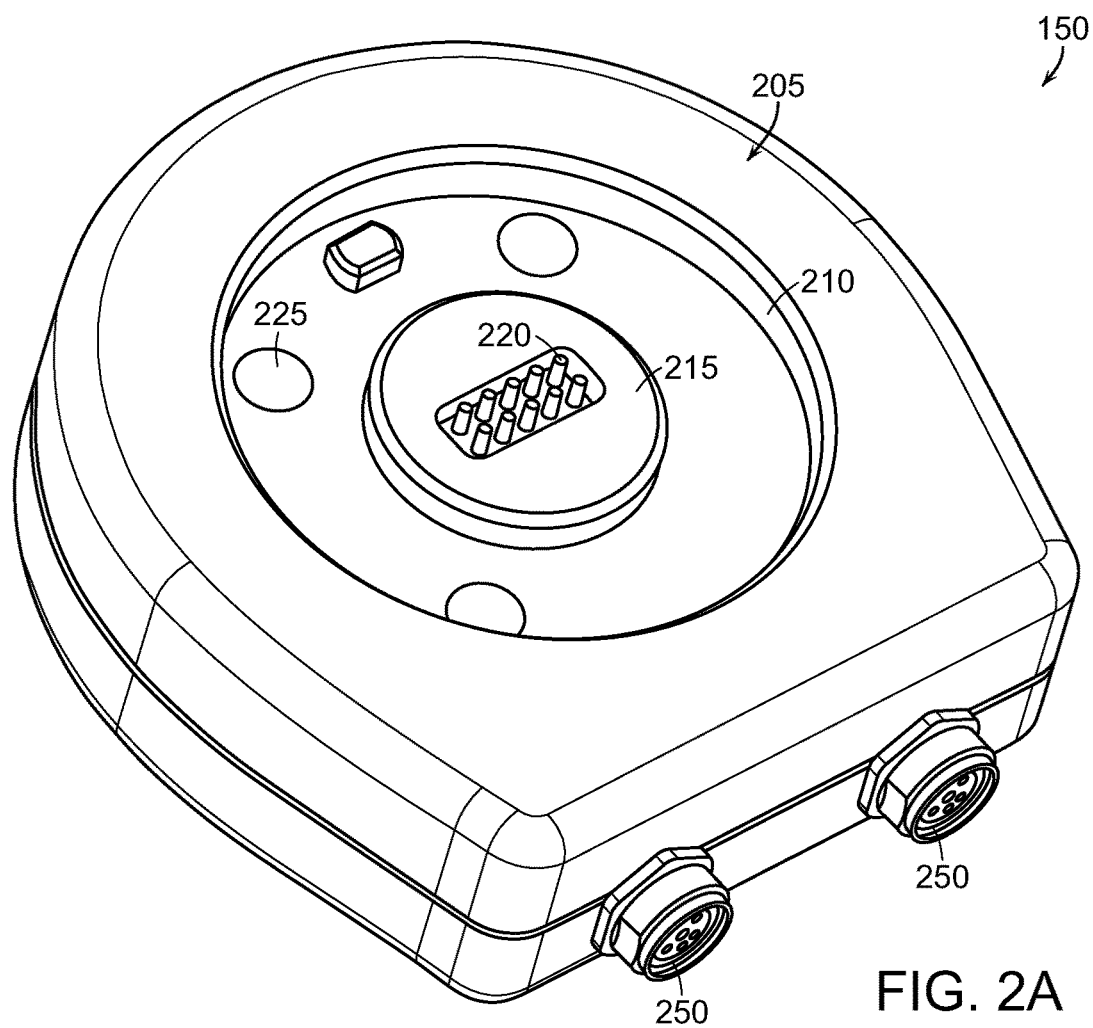
FIGS. 2A and 2B are perspective views of a tool plate in accordance with various embodiments of the invention.
Figure 2B:
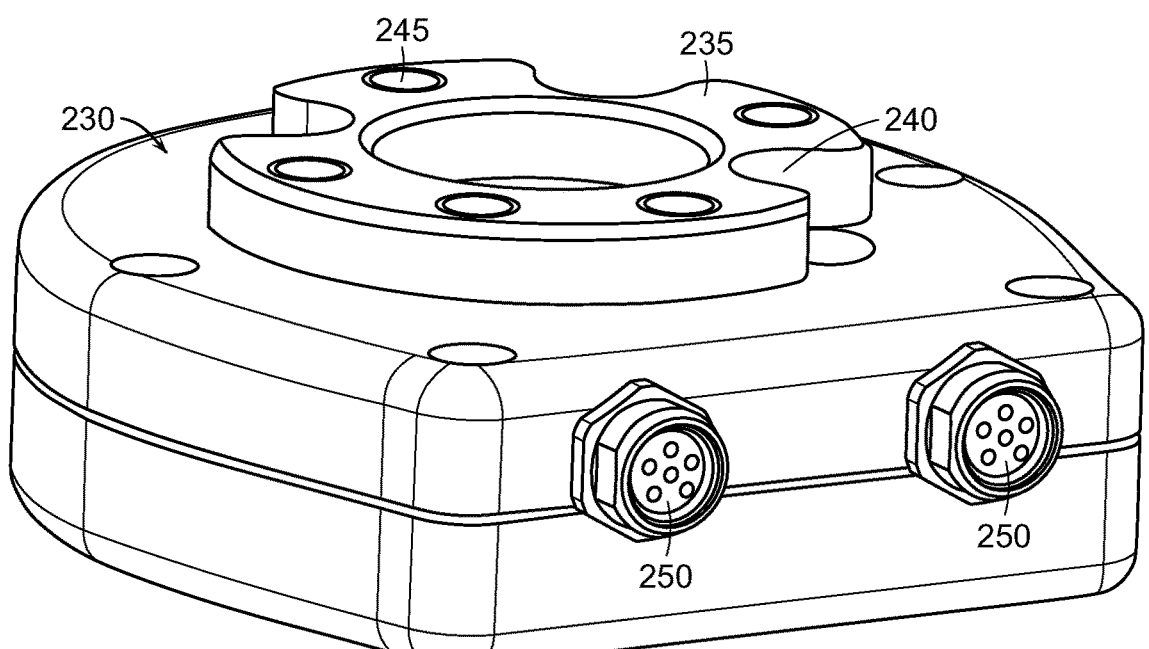
Figure 3A:
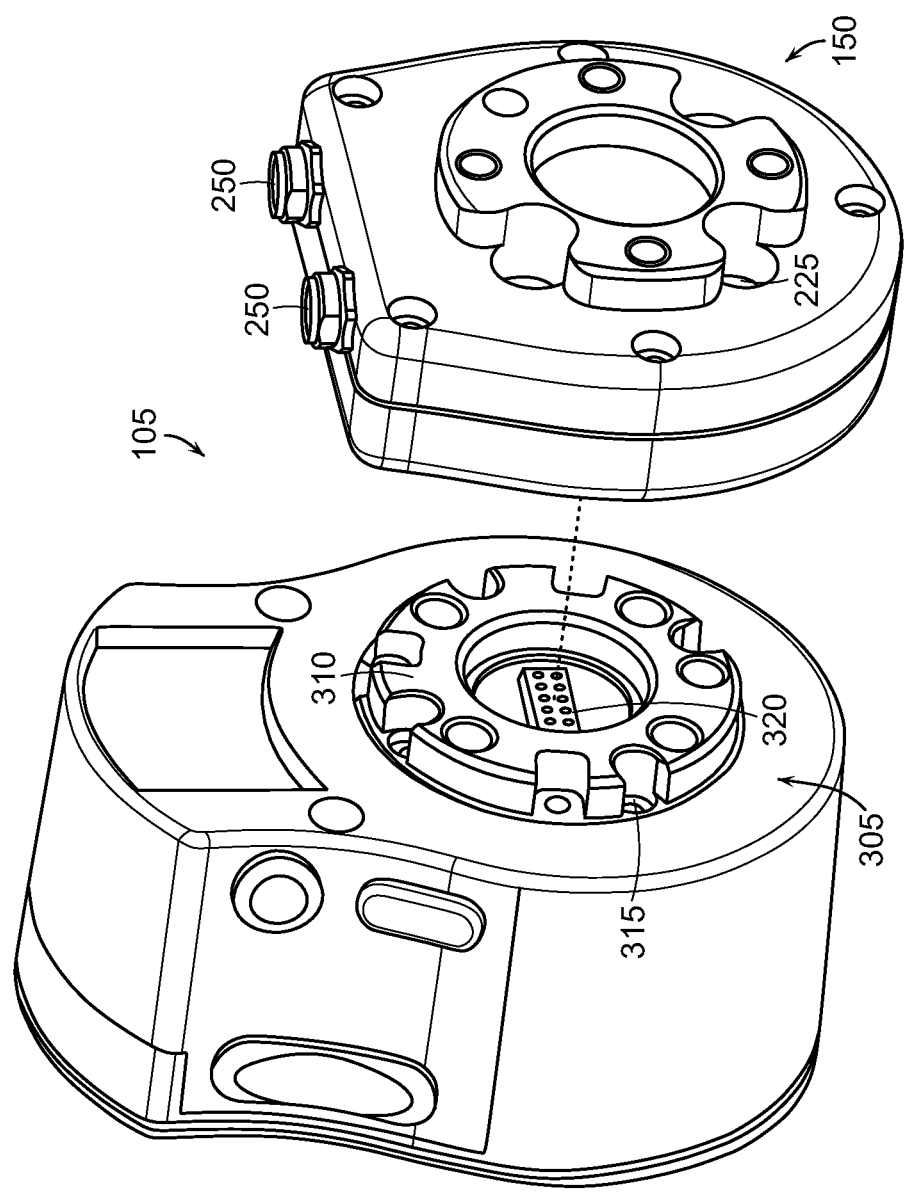
FIGS. 3A and 3B are perspective and plan views, respectively, that show the manner in which a tool plate in accordance with various embodiments of the invention may mate with the end of a robot arm.
Figure 3B:
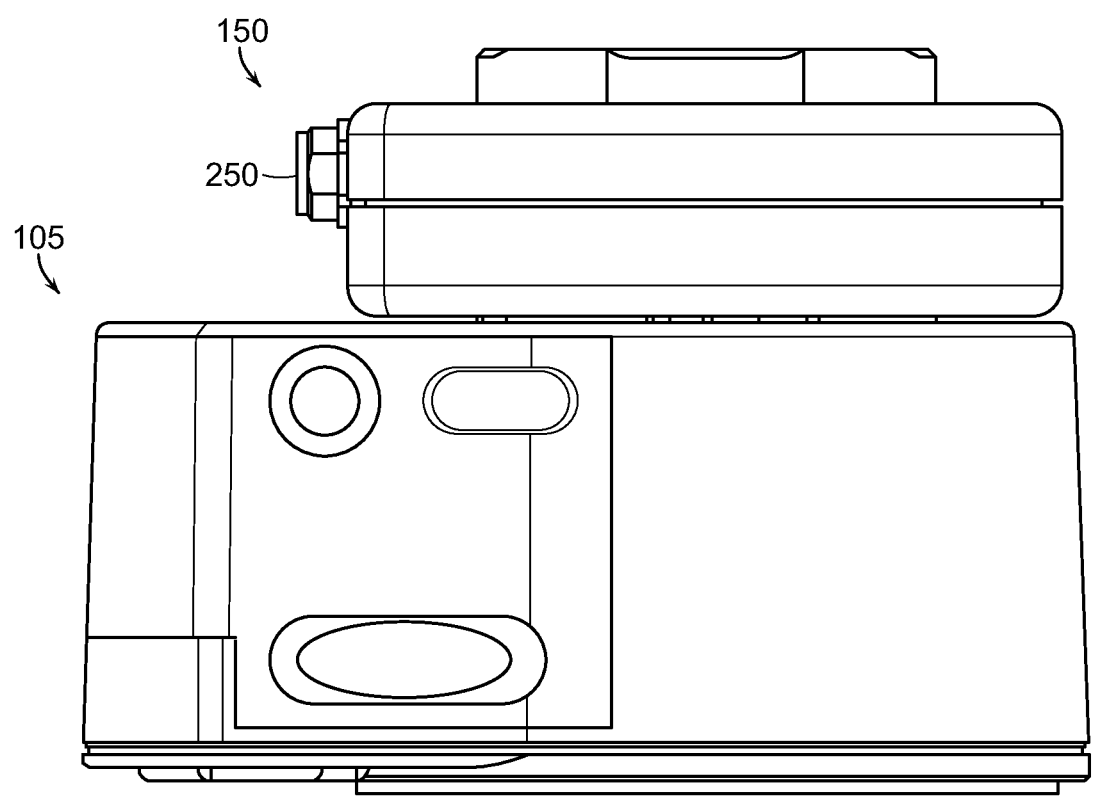

FIGS. 2A and 2B illustrate both faces of a tool plate 150 in accordance with various embodiments of the invention, and FIGS. 3A and 3B depict its attachment to the end of a robot arm. The face 205 includes a recess 210 having a circular perimeter and, at the center of the recess 210, a raised platform 215 within which are 10 spring-loaded pins (e.g., pogo pins) 220 for establishing removable electrical connection to complementary receptacles. A plurality of bores 225 extend through the tool plate 150 and allow bolts to be passed through for secure attachment to the robot arm. In the illustrated embodiment, the effector-facing face 230 includes a raised annular ridge 235 with indentations 240 exposing the bores 225. In some embodiments, these indentations 240 interlock with complementary extensions into the annular recess on the end effector (not shown) that receives the ridge 235. A series of bolt holes 245 along the top surface of the ridge 235 allow the end effector to be secured to the tool plate 150. In the illustrated embodiment, attachment of an end effector to a tool plate 150 (e.g., to the face 230) results only in a mechanical connection. Electrical signals and power may be delivered to the mounted end effector by one or more (e.g., a pair of) electrical connectors 250 (e.g., M8 industrial connectors), which are connected via suitable cables to the end effector. As explained in detail below, the electrical signals and power typically originate with the robot controller and are received by the tool plate 150 via the pin connectors 220. The tool plate 150 may include circuitry that converts signals and/or power received from the robot into a different form for the end effector mounted thereto.

With reference to FIGS. 2A and 3A, the tool plate 150 is brought into contact with the end face 305 of the robot arm 105, and the raised annular ridge 310 on the end face 305 is received within the complementary recess 210 of the tool plate 150. A series of bolt holes 315 align with the bores 225 through the tool plate, allowing the tool plate 150 to be bolted or otherwise mechanically secured to the robot arm 105; in some embodiments, however, a quick-release latch is used instead of bolts. The pin connectors 220 are received in a receptacle 320 as the tool plate 150 and the robot arm 105 assume the mated configuration illustrated in FIG. 3B.

Figure 4:
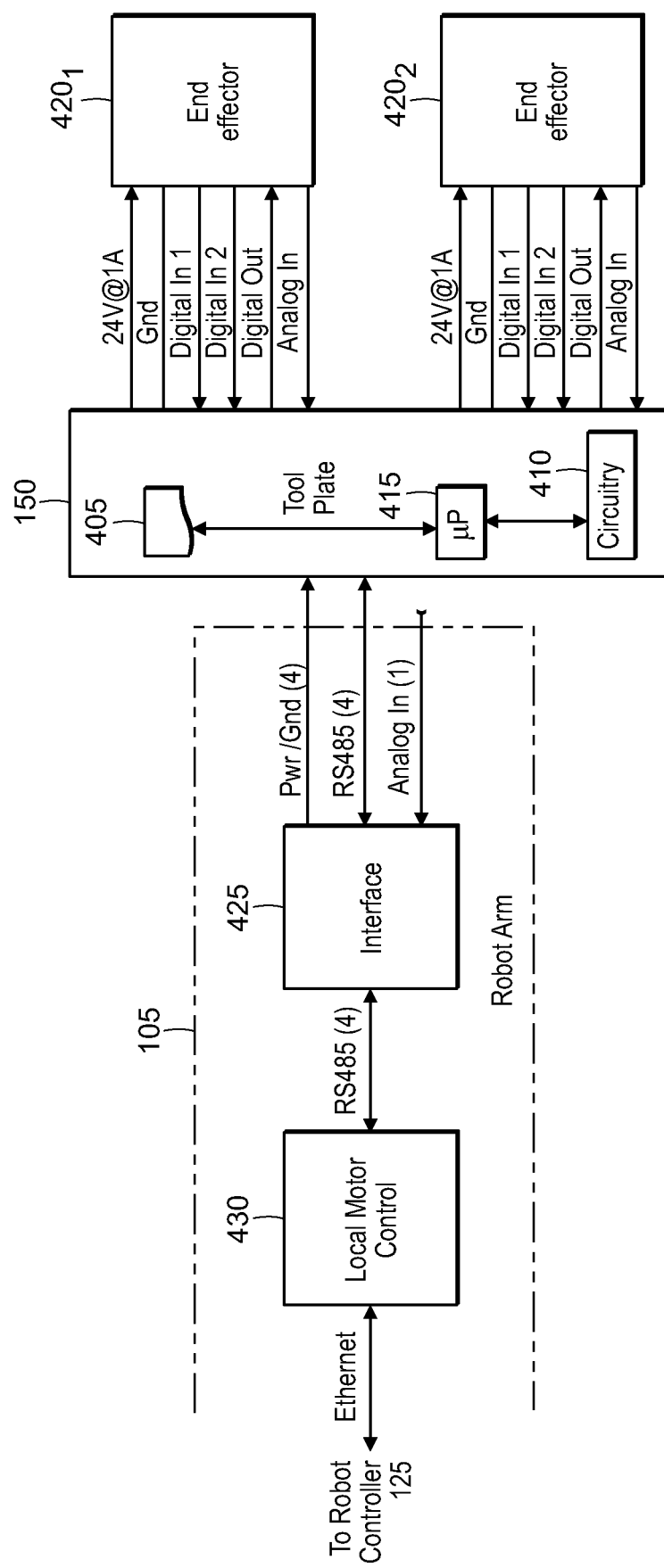
FIG. 4 schematically depicts an interoperating system including a robot arm, a tool plate, and a pair of end effectors in accordance with various embodiments of the invention.

The operation and key internal components of the tool plate 150 are illustrated in FIG. 4. The tool plate includes a memory 405, support circuitry 410, and a control element 415 that may be a microprocessor, microcontroller, or other suitable component. The capabilities of the control element 415 depend on the functions assigned to the tool plate 150, as described below. The tool plate mechanically and electrically mates with one or more end effectors 420, two of which are representatively shown at $420_1$, $420_2$; that is, the tool plate 150 has two receptacles, one for each of the end effectors 420, and each containing appropriate features to facilitate mechanical and electrical mating therewith. As noted above, the tool plate 150 may simultaneously accommodate more than one end effector 420 and/or may interchangeably accommodate different types of end effectors. For example, instead of grippers with fingers that close around an object as shown in FIG. 1, an end effector 420 may include suction grippers or other means of holding or manipulating an object. Alternatively or additionally, the end effector may be a tool (such as a drill, saw, welder, etc.), a measuring device (such as e.g., a scale, gauge, etc.) or other function-implementing device.

When mated mechanically and electrically with the robot arm 105, the tool plate 150 receives power and establishes communication with the robot controller 125 (see FIG. 1B). Typically, this occurs via intermediary hardware such as an interface 425 and a local motor controller 430. The interface supplies power from the robot to the tool plate 150 and supports bidirectional data communication with the tool plate 150 via, for example, the RS-485 serial communication protocol; the support circuitry 410 of the tool plate 150 contains complementary communication components. The local motor controller 430 receives commands from the robot controller 125 (via, for example, a link-layer protocol such as Ethernet) and actuates motors associated with one or more nearby joints of the robot arm 105 to effect the commands. In the illustrated implementation, the local controller 430 also receives commands from the robot controller 125 that operate the end effectors 420. It communicates these commands to the tool plate 150 via the interface 425 (using RS-485, for example), and the tool plate 150 issues commands (or provides power) to the addressed end effector via the Digital Out line. The commands are typically low-level commands specific to the end effector. That is, although the tool plate 150 could be configured to accept high-level, generic commands from the robot controller 125 and translate these into effector-specific signals, usually this is not done; rather, in more typical implementations, the robot controller 125 has "self-configured" to deliver effector-specific commands. The manner in which this may be accomplished is explained below. It should also be emphasized that the robot arm 105 may itself include a processor that can perform higher-level tasks. Thus, while the processor 415 may act as a "master" to control communications with the robot arm 125, it may instead act as a "slave" to a processor in the robot arm (which may, for example, poll the tool plate 150 and transmit data to the robot controller).

When an end effector 420 is mated with the tool plate 150, various communications take place whose end result is to provide power to and enable communication between the robot controller 125 and the end effector 420, but also to enable the robot controller to self-configure in order to operate the end effector. In one representative implementation, the end effector is a "dumb" device with no onboard information to offer the robot controller. The tool plate 150 recognizes the end effector because of the receptacle configuration (e.g., it is designed to accept a single type of end effector), or from its mechanical and/or electrical characteristics, or because the tool plate accommodates only one type of end effector. In the illustrated embodiment, the memory 405 stores an identifier for each of the two possible end effectors $420_1$, $420_2$. When the control element 415 detects attachment of a particular end effector, it communicates the corresponding identifier to the robot controller 125 via the robot arm 105. The robot controller uses the communicated identifier to locate, in the database 140 (see FIG. 1B), configuration information for the end effector. The database 140 may contain a library of configuration information (e.g., drivers or pointers to drivers stored elsewhere), and upon selection of the driver information based on the received end-effector identifier, the robot controller 125 self-configures, i.e., loads and installs the proper driver. Because the tool plate 150 may detect both installation and removal of an end effector, these may be "hot swapped" in real time without powering down and re-booting the robot; via the circuitry 410, the control element 415 will alert the robot controller 125 that a new end effector has been attached, and provide the identifier for the new end effector.

Detecting attachment of an end effector, either by the tool plate 150 or by the robot controller 125 (if, for example, the end effector is attached directly to a robot arm 105), may occur in an active or passive fashion. For example, the end effector or tool plate can initiate communication with the robot controller or the tool plate. Alternatively, the end effector or tool plate may, upon attachment, emit a characteristic signal that is detected by the robot controller polling for that signal. In either case, the robot controller 125 (or, in some implementations, the robot arm 105) sends commands to the end effector or the tool plate, which responds with data (I/O or status data, or stored configuration/identification data, depending on the command).

In some embodiments, the configuration information is stored in the memory 405 of the tool plate 150, and upon detecting attachment of an end effector, the control element 415 locates the corresponding configuration information in the memory 405 and transmits this to the robot controller 125. Once again, the configuration information may be the driver itself or a pointer thereto, enabling the robot controller 125 to download the latest version of the driver before self-configuring, or information that enables the robot controller 125 to parameterize a generic driver for the particular end effector. The memory 405 may also store end-effector-specific metrics such as cycle counts and hours of operation, allowing for preventive maintenance such as replacing suction cups and/or other components when they are near their rated cycle limit.

In various implementations, any of the receptacles 420 may accommodate more than one type of end effector. In such cases, the end effector may store an identifier that is provided to (or retrieved by) the tool plate 150 upon establishing communication with a newly installed end effector. In this case, the tool plate 150 communicates the identifier to the robot controller 125 or, in some embodiments, uses the identifier to retrieve configuration information from the memory 405 and sends this information to the robot controller 125. The optimal distribution of information—i.e., whether to store configuration information on the tool plate 150 or in nonvolatile memory on the robot itself—represents a design choice. The more information that is stored on the tool plate 150, the more generic the robot can be, but the more memory the tool plate 150 will require. Another consideration is the need to update information or programming. For example, if the configuration data is subject to change over time, it may be desirable to store only unchanging information, such as an end-effector identifier, in the memory 405; the robot controller 125 can verify, at power-up or when installation of a new robot arm is detected, that it has the most current driver. It is possible, of course, to include functionality on the tool plate 150 enabling it to check for updates to stored configuration information before providing it to the robot, but such capability requires either on-board connectivity or the ability to access the network resources (e.g., via the Internet) through the robot.

In cases where the end effector is "smart," i.e., contains its own configuration information, this may be retrieved by the tool plate 150 and provided to the robot controller 125. It is even possible for the tool plate 150 to communicate wirelessly with end effectors and/or the robot controller 125 using a suitable on-board wireless interface. If, on the other hand, the robot controller 125 is unable to locate a suitable driver, it may search for a driver in a remote (e.g., hosted) repository of drivers or may autonomously conduct an Internet search for the proper driver, installing and testing proper operation and functionality via the tool plate 150 before actually allowing the robot to operate normally.

As previously noted, the control element 415 of the tool plate 150 may be any suitable microprocessor or microcontroller, depending on the functions that the tool plate is to perform. For example, the control element 415 may be a programmable microcontroller designed expressly for embedded operation, or one or more conventional processors such as the Pentium or Celeron family of processors manufactured by Intel Corporation of Santa Clara, Calif. The memory 405 may store programs and/or data relating to the operations described above. The memory 405 may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), or programmable logic devices (PLD).

Figure 5:
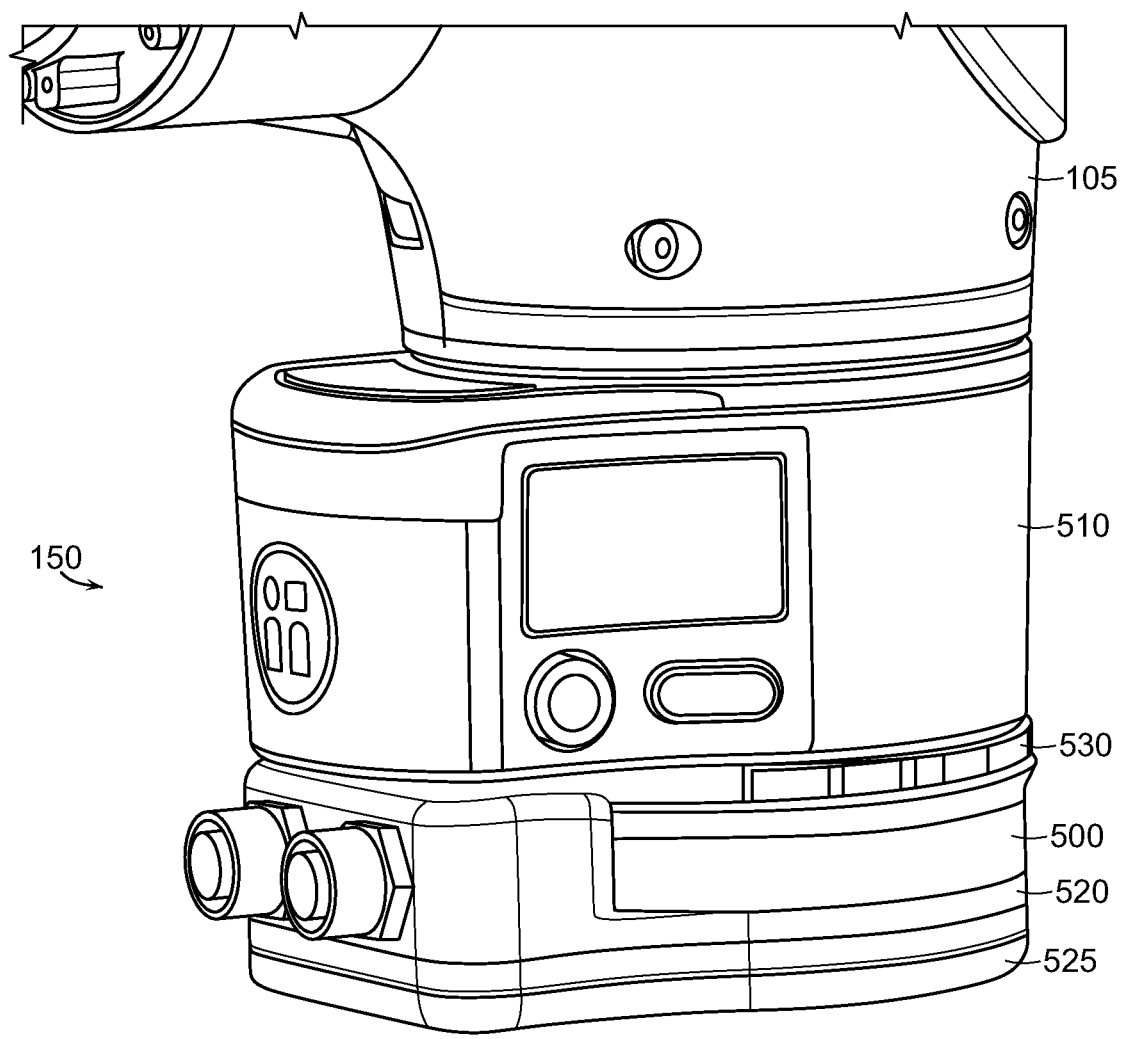
FIG. 5 is a perspective view of a tool plate in accordance with various embodiments of the invention mated with the end of a robot arm.
Figure 6:
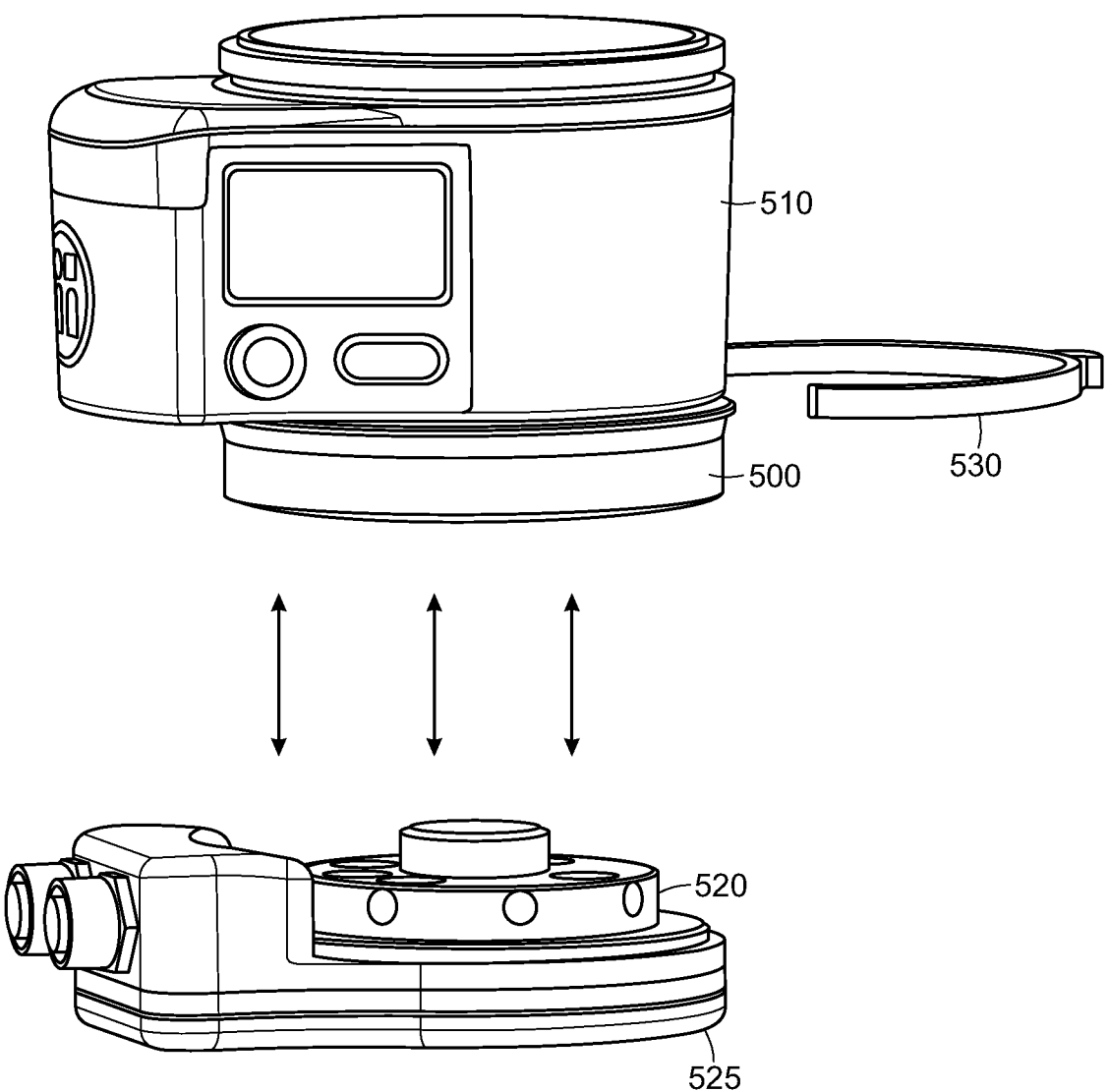
FIG. 6 is a perspective view of various components of the tool plate of FIG. 5 disengaged from each other in accordance with various embodiments of the invention.

In various embodiments of the present invention, and as illustrated in FIG. 5, a tool plate 150 may have a "robot side" 500 incorporating a quick-release mechanism that is itself secured to the end or "cuff" 510 of the robot appendage 105, and a "tool side" 520 (opposed to the robot side 500) that receives one or more end effectors. Typically, the robot side 500 is fixedly mounted (e.g., bolted) to the robot appendage 105. The tool side 520 of the tool plate 150 may be fixedly mounted (e.g., bolted) to one or more end effectors. For example, the tool side 520 may include an interchangeable adaptor plate 525 configured to mechanically couple to one or more types of end effector. This arrangement enables not only the end effectors but also the tool plate 150, or a portion thereof (e.g., the tool side 520 or the adaptor plate 525), to be conveniently interchanged or connected to another robot (via another robot-side portion affixed thereto) with mechanical security but without tools, air pressure, or electric actuation. In various embodiments, the robot side 500 may quickly and easily detach from the tool side 520 via a quick-release mechanism (detailed below). As shown in FIG. 5, the quick-release mechanism may incorporate a removable security collar 530 that, when engaged as shown in FIG. 5, secures the tool side 520, and thus the tool plate 150, to the robot both axially and rotationally. FIG. 6 depicts the tool side 520 of the tool plate 150 disengaged from the robot side 500 via removal of the security collar 530. As shown, the robot side 500 may remain affixed to the cuff 510 of the robot appendage.

Figure 7:
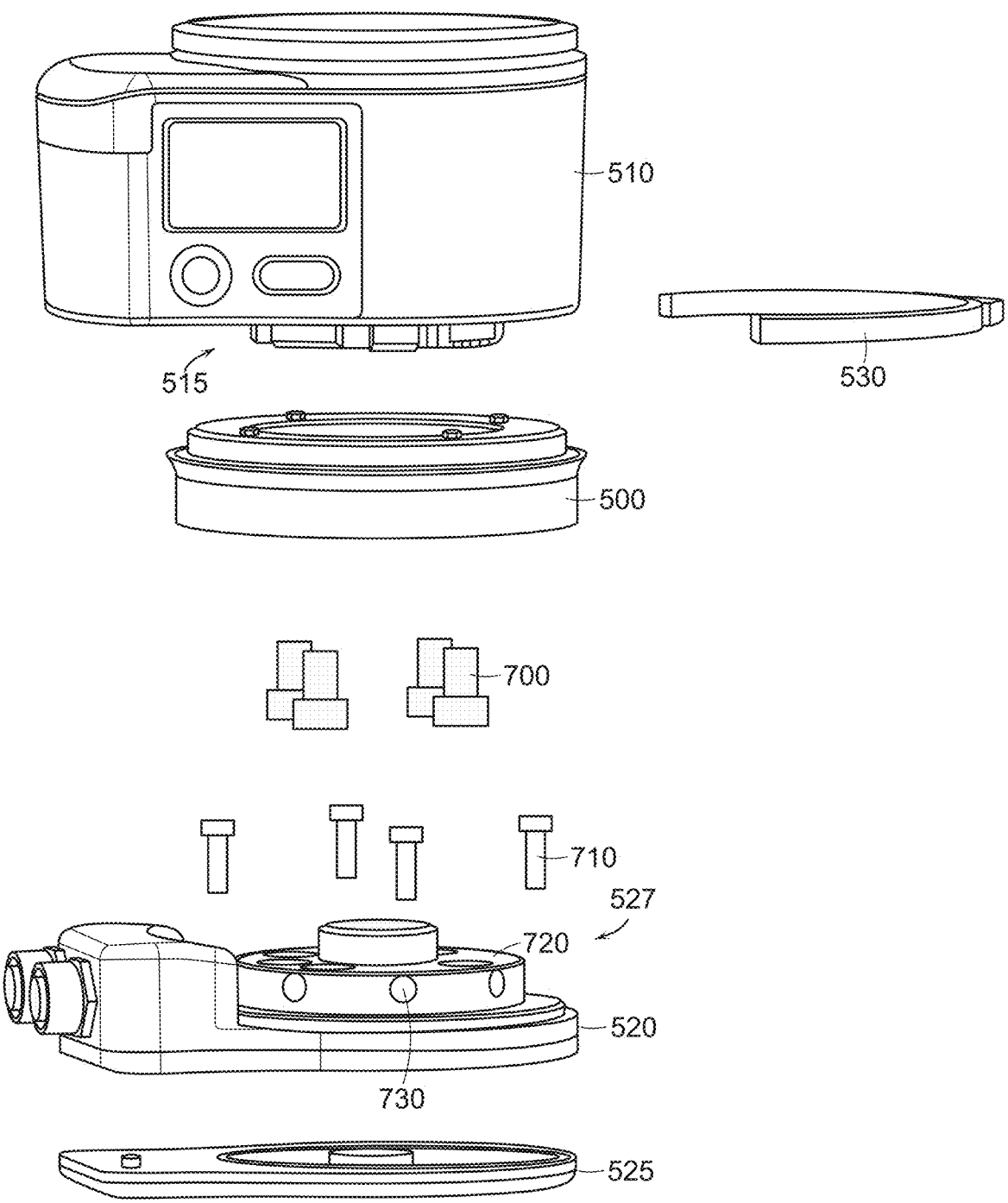
FIG. 7 is an exploded view of various components of the tool plate of FIG. 5 in accordance with various embodiments of the invention.

FIG. 7 is an exploded view of the tool plate 150 of FIGS. 5 and 6. As shown, the robot side 500, which incorporates the quick-release mechanism (detailed below), may be affixed to the cuff 510 of the robot appendage via one or more bolts 700 or other fasteners. As also shown, the robot side 500 is annular and accommodates a first connector 515 on the robot appendage therein when the robot side is mounted to the cuff 510. The tool side 520 of the tool plate 150 may include adapter plate 525 that may be changed depending on the end effector(s) to be employed and which may be attached to tool side 520 via one or more bolts 710 or other fasteners. As shown, the tool side 520 includes a second connector 527 configured to extend into the robot side 500 and mate with the first connector 515, as indicated in FIGS. 5 and 6. In accordance with various embodiments of the invention, a raised portion 720 of tool side 520 includes a series of circumferentially distributed (and typically equidistant) depressions, one of which is indicated representatively at 730. As will be seen, these depressions receive bearing balls that act to lock the tool side 520 to the robot side 500 in a locked configuration.

Specifically, in various embodiments, the quick-release mechanism of the robot side 500 contains captive spherical bearing balls that move radially inward or outward depending on the position of an axially slidable retaining ring, and which are received within complementary depressions 730 in the tool side 520 of the tool plate 150. The inner surface of the sliding ring may be tapered so that axial motion of the sliding ring causes radial movement of the bearing balls and secures them within the depressions 730. Thus seated, the bearing balls prevent axial movement of the tool side 520 of the tool plate 150. To release the tool side 520 of the tool plate 150 from the robot side 500, the sliding ring is manually shifted, allowing the bearing balls to move radially outward, thereby freeing the tool side 520 of the tool plate 150. Removable security collar 530 may be employed to prevent this sliding movement and, hence, keep the tool plate 150 secured to the robot both axially and rotationally. Although the depressions 730 are shown as hemispherical in shape (i.e., circular in cross-section or perimeter), in various embodiments one or more (or even all) of the depressions 730 may have other shapes (e.g., oblong, ovular, polygonal in cross-section or perimeter) that do not necessarily conform to the shape of the spherical bearing balls but that are nonetheless effective to secure the bearing balls therewithin and thereby prevent axial motion of the tool side 520 of the tool plate 150.

Figure 8:
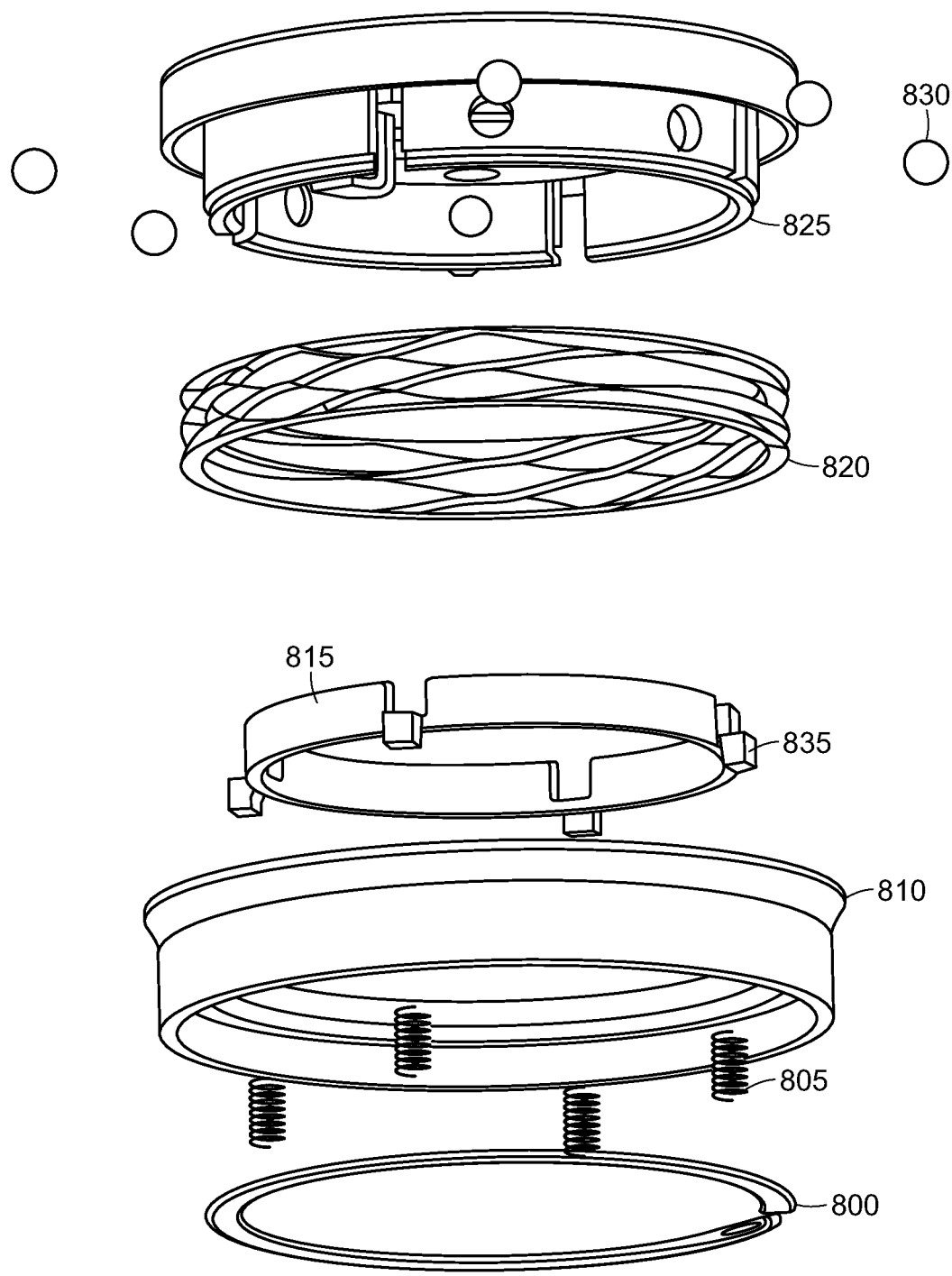
FIG. 8 is an exploded view of a quick-release mechanism of a robot side of a tool plate in accordance with various embodiments of the invention.

Various components of a quick-release mechanism of robot side 500 of a tool plate 150 are shown in the exploded view of FIG. 8. These include a top retaining ring 800, a plurality of compression springs 805, a sliding ring 810 whose axial movement controls the operation of the quick-release mechanism, a ball-stop ring 815, a compression wave spring 820, a bearing retainer 825, and a plurality of bearing balls 830. The sliding ring 810 may include a lip or flange that the user may engage manually when moving the ring. The compression wave spring 820 (or, in other embodiments, another type of compression spring such as a coil spring) rests on the top surface of an interior ridge of the sliding ring 810, providing assistive force for axial movement of the sliding ring 810 and concomitant engagement of the bearing balls 830 in the complementary recesses 730, as described below. The sliding ring 810 and the bearing retainer 825 may include, consist essentially of, or consist of one or more metals, e.g., stainless steel and/or a refractory metallic material such as titanium, tungsten, hafnium, tantalum, and/or niobium.

Figure 9:
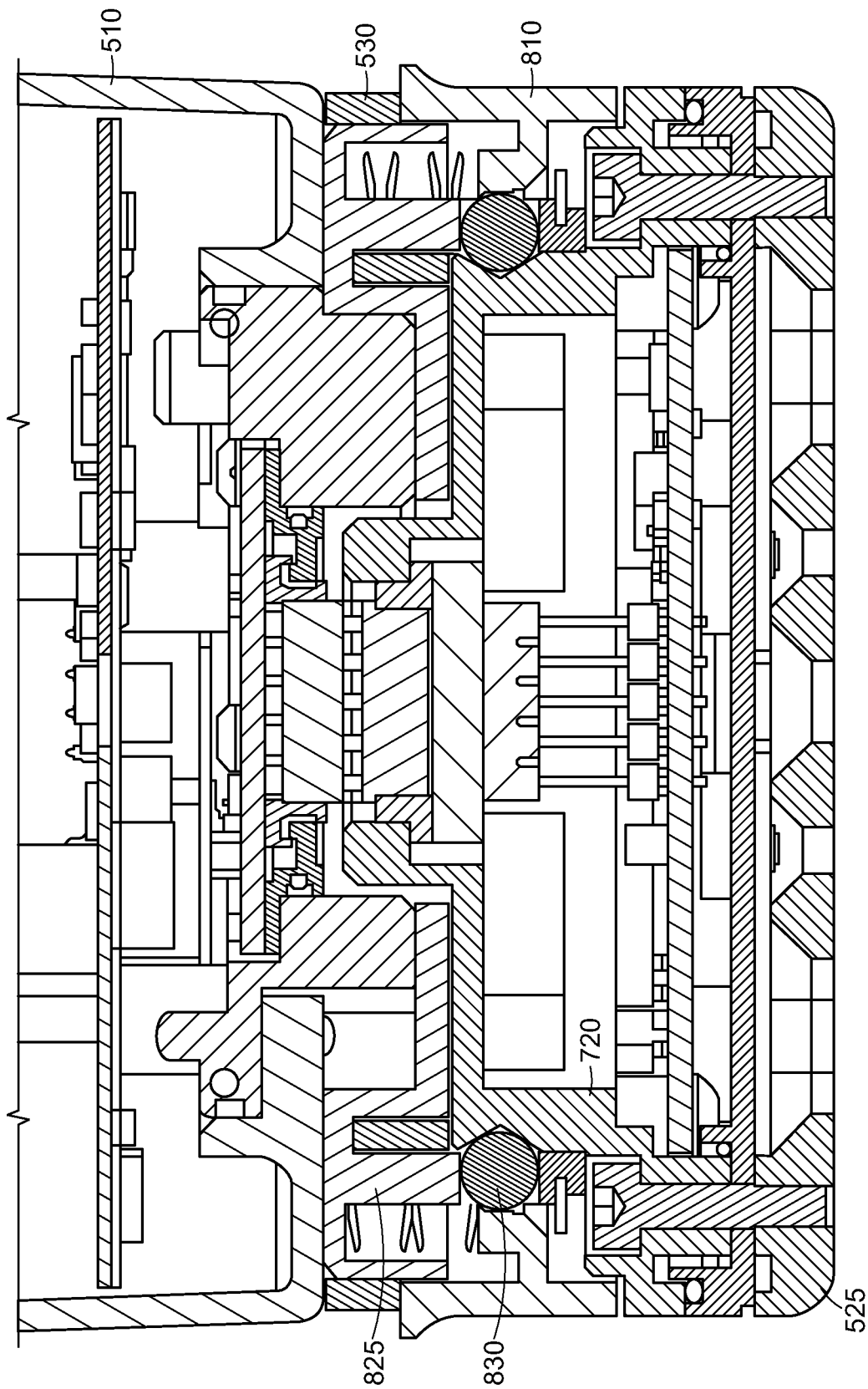
FIG. 9 is a cross-sectional view of a tool plate in accordance with various embodiments of the invention.

As shown in FIG. 9, the raised portion 720 of the tool side 520 is received within the interior of the bearing retainer 825 and the sliding ring 810. The mechanism of action may be seen in FIGS. 9-11. Before the raised portion 720 of the tool side 520 is received within the interior of the bearing retainer 825, the ball-stop ring 815 lies concentrically adjacent to the interior surface of the bearing retainer 825, preventing the bearing balls 830 from migrating inwardly. It is retained in this configuration by the compression springs 805, which rest against the tabs 835 of the ball-stop ring 815. As the raised portion 720 enters the bearing retainer 825, it forces the ball-stop ring 815 against the compression springs 805 and into a recessed portion of the bearing retainer 825. Hence, the ball-stop ring 815 provides a push-to-connect functionality that responsively actuates the locking mechanism as the user pushes the raised portion 720 of the tool side 520 into the quick-release mechanism; the user need not, for example, lift the sliding ring 810 in order to connect the tool plate 150.

Figure 10:
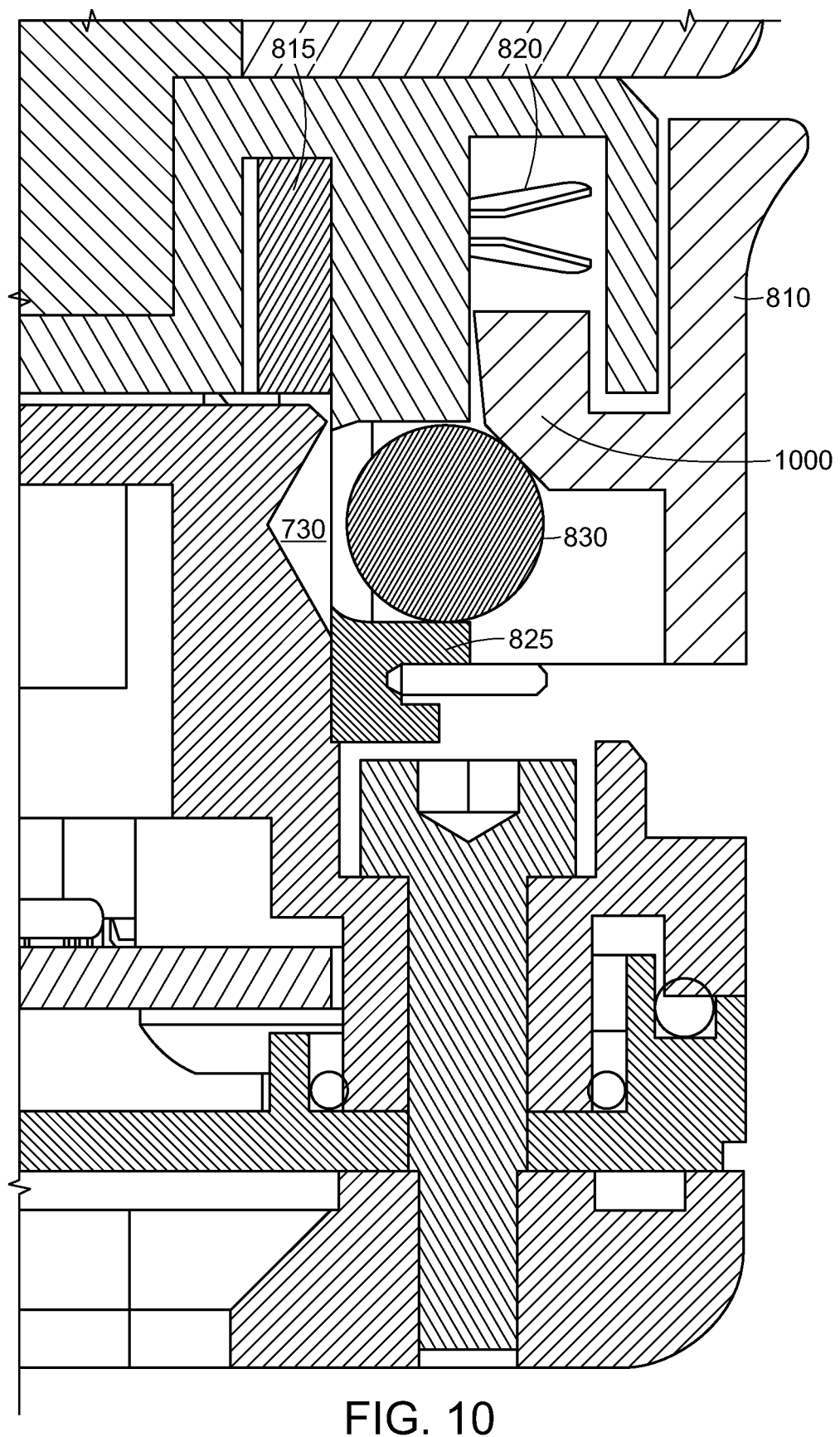
FIG. 10 is a magnified partial view of the cross-section of FIG. 9 in which the tool side and robot side of the tool plate are in a disengaged configuration in accordance with various embodiments of the invention.

In the disengaged position shown in FIG. 10, the bearing balls 830 sit loosely between the depressions 730 of the raised portion of the tool side 520 and a beveled edge of an interior ridge 1000 of the sliding ring 810. The tool side 520 may be freely withdrawn, and the compression springs 805 will urge the ball-stop ring 815 so that it follows the tool side 520 and prevents the bearing balls 830 from migrating inwardly, as shown in FIG. 10.

Figure 11:
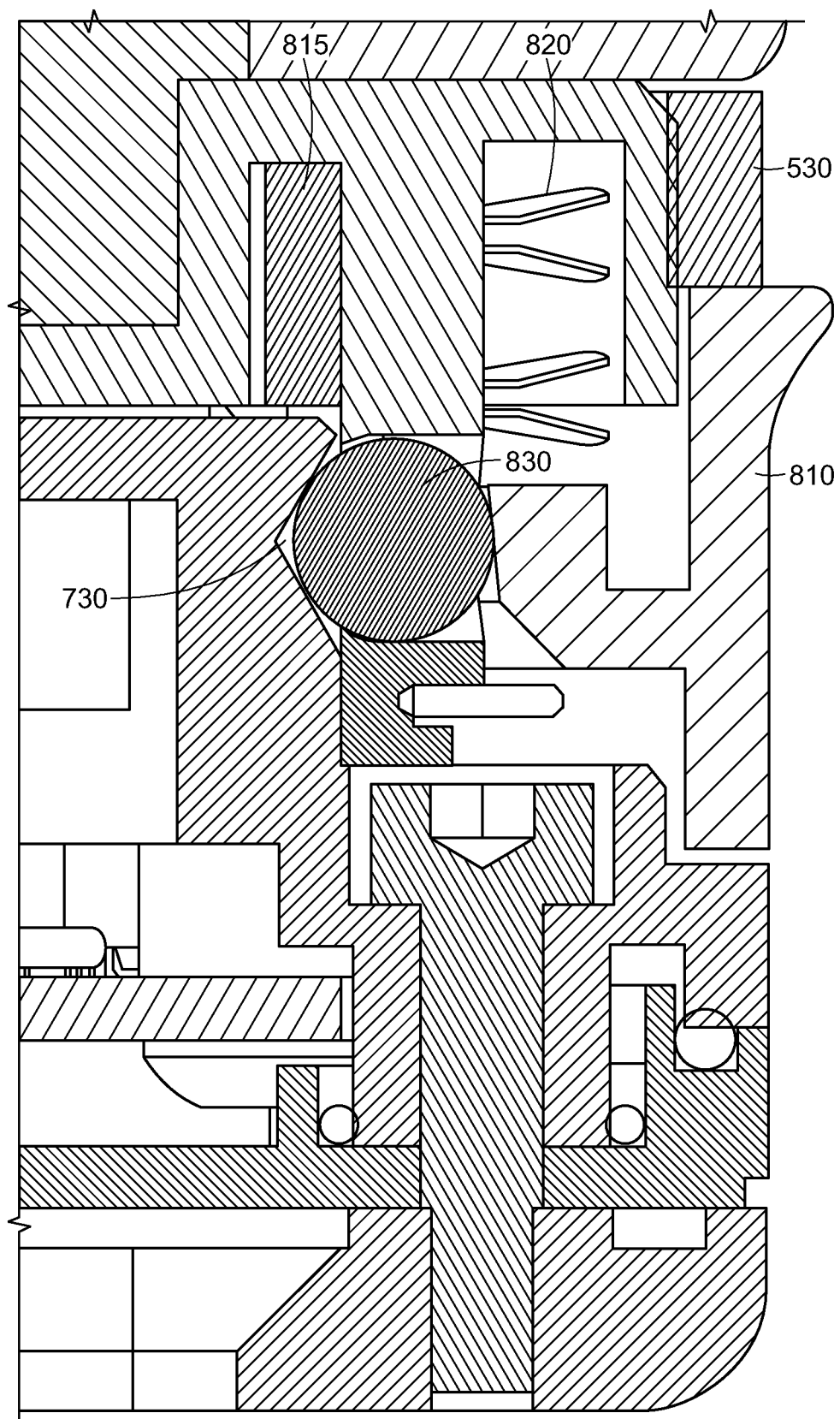
FIG. 11 is a magnified partial view of the cross-section of FIG. 9 in which the tool side and robot side of the tool plate are in an engaged configuration in accordance with various embodiments of the invention.

When the sliding ring 810 is moved axially (downward, as shown in FIG. 11), assisted by the compression wave spring 820, the interior surface of the ridge 1000, which is tapered (by, for example, approximately 2° to approximately 20°, e.g., approximately 5°), translates the bearing balls 830 radially inwardly so they seat within the countersunk depressions 730, and outward movement is prevented by the sliding ring 810 itself. The spring force of compression wave spring 820 acts to retain the sliding ring 810 in this engaged position; however, the security collar 530 may be put into place to prevent upward movement of the sliding ring 810. The bearing balls 830 firmly retain the tool side 520 engaged with the robot side 500. In various embodiments, the quick-release mechanism utilizes six bearing balls 830, which may be, but are not necessarily, spaced equidistant from each other around the circumference of bearing retainer 825. The optimal number of bearing balls is payload-dependent, and in typical applications may be as few as three or as many as eight, or even more. Similarly, the number of tabs 835 of the ball-stop ring 815, and corresponding springs 805, may vary from as few as three or as many as eight, or even more.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. For use with a robot system comprising a robot body, a robot arm connected to the robot body and having a distal end including a first connector, a robot controller for controlling the robot arm, and an end effector configured to connect to the robot arm, an end-effector assembly comprising:

a tool plate comprising (i) a robot side configured to be mountable to the distal end of the robot arm, wherein the robot side is annular and accommodates the first connector therein when the robot side is mounted to the distal end of the robot arm, and (ii) a tool side configured to removably connect to the robot side, wherein the tool side comprises a second connector configured to extend into the robot side and mate with the first connector;

incorporated in the tool plate, a quick-release mechanism configured to removably retain the tool side of the tool plate against the robot side of the tool plate; and disposed at an interface between the robot side and the distal end of the robot arm, a removable security collar configured to engage with the quick-release mechanism to prevent removal of the tool side of the tool plate from the robot side of the tool plate when the security collar is placed onto the quick-release mechanism by an operator and allow removal of the tool side of the tool plate from the robot side of the tool plate when the security collar is removed from the quick-release mechanism by the operator.

2. The end-effector assembly of claim 1, wherein:

the tool side of the tool plate comprises a raised portion having a series of depressions circumferentially arranged around a side wall thereof, wherein the second connector is disposed above the raised portion; and the quick-release mechanism comprises, disposed within the robot side of the tool plate, a recess for receiving the raised portion of the tool side of the tool plate, a ring surrounding the recess and slidable along an axis concentric therewith, and a plurality of bearing balls arranged circumferentially around an interior surface of the slidable ring, whereby axial movement of the ring in a first direction locks the bearing balls within the depressions of the raised portion of the tool side of the tool plate, thereby retaining the tool side of the tool plate within the quick-release mechanism, and axial movement of the ring in a second direction opposed to the first direction releases the bearing balls from the depressions, thereby releasing the tool side of the tool plate from the quick-release mechanism.

3. The end-effector assembly of claim 2, wherein the slidable ring has a tapered inner surface for translating the bearing balls into the depressions during axial movement of the ring in the first direction.

4. The end-effector assembly of claim 2, further comprising, disposed on the robot side of the tool plate, a spring-loaded, retractable retention ring for preventing inward radial movement of the bearing balls in a rest position and, when retracted against the spring loading in response to entry of the raised portion of the tool side of the tool plate, allowing movement of the bearing balls into the depressions.

5. The end-effector assembly of claim 4, wherein the retention ring is spring-loaded via a compression wave spring.

6. The end-effector assembly of claim 2, wherein the removable security collar is configured to engage with the quick-release mechanism proximate the slidable ring, whereby axial movement of the slidable ring in the second direction is prevented when the security collar is placed onto the quick-release mechanism by the operator.

7. The end-effector assembly of claim 1, further comprising a removable adaptor plate configured to be attached to the tool side of the tool plate and to couple the end effector to the tool side of the tool plate.

8. The end-effector assembly of claim 7, wherein the adaptor plate is configured to be attached to the tool side of the tool plate on a surface of the tool side of the tool plate opposite the second connector.

9. The end-effector assembly of claim 1, wherein the removable security collar is C-shaped.

10. The end-effector assembly of claim 1, wherein the tool side of the tool plate comprises:
nonvolatile memory storing data comprising at least one of identification information or configuration information for the end effector;
a communication interface; and
a processor configured to cause transmission of the data to the robot controller, upon mating of the first and second connectors, via bidirectional communication between the processor and the robot controller established via the communication interface.

11. A robot system comprising:
a robot body;
a robot arm connected to the robot body, the robot arm having a distal end including a first connector;
a robot controller for controlling the robot arm and an end effector connected thereto;
a tool plate comprising (i) a robot side configured to be mountable to the distal end of the robot arm, wherein the robot side is annular and accommodates the first connector therein when the robot side is mounted to the distal end of the robot arm, and (ii) a tool side configured to removably connect to the robot side, wherein the tool side comprises a second connector configured to extend into the robot side and mate with the first connector;
an end effector connected to the tool side of the tool plate;
incorporated in the tool plate, a quick-release mechanism configured to removably retain the tool side of the tool plate against the robot side of the tool plate; and
disposed at an interface between the robot side and the distal end of the robot arm, a removable security collar configured to engage with the quick-release mechanism to prevent removal of the tool side of the tool plate from the robot side of the tool plate when the security collar is placed onto the quick-release mechanism by an operator and allow removal of the tool side of the tool plate from the robot side of the tool plate when the security collar is removed from the quick-release mechanism by the operator.

12. The robot system of claim 11, wherein:
the tool side of the tool plate comprises a raised portion having a series of depressions circumferentially arranged around a side wall thereof, wherein the second connector is disposed above the raised portion; and
the quick-release mechanism comprises, disposed within the robot side of the tool plate, a recess for receiving the raised portion of the tool side of the tool plate, a ring surrounding the recess and slidable along an axis concentric therewith, and a plurality of bearing balls arranged circumferentially around an interior surface of the slidable ring, whereby axial movement of the ring in a first direction locks the bearing balls within the depressions of the raised portion of the tool side of the tool plate, thereby retaining the tool side of the tool plate within the quick-release mechanism, and axial movement of the ring in a second direction opposed to the first direction releases the bearing balls from the depressions, thereby releasing the tool side of the tool plate from the quick-release mechanism.

13. The robot system of claim 12, wherein the slidable ring has a tapered inner surface for translating the bearing balls into the depressions during axial movement of the ring in the first direction.

14. The robot system of claim 12, further comprising, disposed on the robot side of the tool plate, a spring-loaded, retractable retention ring for preventing inward radial movement of the bearing balls in a rest position and, when retracted against the spring loading in response to entry of the raised portion of the tool side of the tool plate, allowing movement of the bearing balls into the depressions.

15. The robot system of claim 14, wherein the retention ring is spring-loaded via a compression wave spring.

16. The robot system of claim 12, further wherein the removable security collar is configured to engage with the quick-release mechanism proximate the slidable ring, whereby axial movement of the slidable ring in the second direction is prevented when the security collar is placed onto the quick-release mechanism by the operator.

17. The robot system of claim 11, further comprising a removable adaptor plate configured to be attached to the tool side of the tool plate and to couple the end effector to the tool side of the tool plate.

18. The robot system of claim 17, wherein the adaptor plate is configured to be attached to the tool side of the tool plate on a surface of the tool side of the tool plate opposite the second connector.

19. The robot system of claim 11, wherein the removable security collar is C-shaped.

20. The robot system of claim 11, wherein the tool side of the tool plate comprises:
nonvolatile memory storing data comprising at least one of identification information or configuration information for the end effector;
a communication interface; and
a processor configured to cause transmission of the data to the robot controller, upon mating of the first and second connectors, via bidirectional communication between the processor and the robot controller established via the communication interface.

21. The robot system of claim 20, wherein the robot controller is adapted to self-configure based on the data and to control movements of the connected end effector based on the self-configuration.

22. The robot system of claim 20, wherein the data includes both identification information and configuration information.

23. The robot system of claim 20, wherein the data includes configuration information.

24. The robot system of claim 23, wherein the configuration information specifies a driver for controlling the end effector.

25. The robot system of claim 24, wherein the configuration information comprises the driver.

26. The robot system of claim 24, wherein the configuration information comprises one or more parameters usable to tailor a generic driver to the end effector.

27. The robot system of claim 24, wherein the configuration information comprises an identifier specifying a type of the driver.

* * * * *